United States Patent
Färber et al.

(10) Patent No.: US 7,113,777 B2
(45) Date of Patent: Sep. 26, 2006

(54) ACCESS METHOD IN COMMUNICATIONS SYSTEMS WITH DIFFERENT SERVICE FEATURE CLASSES, AND A CORRESPONDING COMMUNICATIONS SYSTEM

(75) Inventors: Michael Färber, Wolfratshausen (DE); Jean-Michel Traynard, München (DE)

(73) Assignee: Siemens Aktiengesellschaft, Munich (DE)

(*) Notice: Subject to any disclaimer, the term of this patent is extended or adjusted under 35 U.S.C. 154(b) by 330 days.

(21) Appl. No.: 10/343,798

(22) PCT Filed: Aug. 1, 2001

(86) PCT No.: PCT/DE01/02927

§ 371 (c)(1),
(2), (4) Date: Feb. 4, 2003

(87) PCT Pub. No.: WO02/13563

PCT Pub. Date: Feb. 14, 2002

(65) Prior Publication Data

US 2004/0198345 A1  Oct. 7, 2004

(30) Foreign Application Priority Data

Aug. 4, 2000  (DE) .............................. 100 38 256

(51) Int. Cl.
*H04Q 7/20* (2006.01)
(52) U.S. Cl. .................. 455/426.1; 370/260; 370/310; 370/468; 398/92
(58) Field of Classification Search ............ 455/426.1; 370/468, 310, 260; 359/134; 398/92
See application file for complete search history.

(56) References Cited

U.S. PATENT DOCUMENTS

| | | | |
|---|---|---|---|
| 5,051,993 A * | 9/1991 | DeLuca et al. | 370/310 |
| 5,095,530 A | 3/1992 | Tanaka et al. | |
| 5,420,911 A | 5/1995 | Dahlin et al. | |
| 6,366,589 B1 * | 4/2002 | Naudus et al. | 370/468 |
| 6,553,006 B1 * | 4/2003 | Kalliokulju et al. | 370/310 |
| 6,587,241 B1 * | 7/2003 | Saleh | 398/92 |
| 2003/0016632 A1 * | 1/2003 | Refai et al. | 370/260 |
| 2004/0198345 A1 * | 10/2004 | Farber et al. | 455/426.1 |

FOREIGN PATENT DOCUMENTS

| | | |
|---|---|---|
| DE | 19838832 | 5/2000 |
| EP | 0 994 603 A2 | 4/2000 |
| EP | 0 994 604 | 4/2000 |
| EP | 1 021 056 | 7/2000 |
| WO | WO 97/19525 | 5/1997 |
| WO | WO 98/24250 | 6/1998 |

OTHER PUBLICATIONS

"Inforum", INFOrmationsforum des Rechenzentrums der Universität Münster, Jahrgang 21, Nr. 4—Nov. 1997, ISSN 0931-4008, pp. 11-13.
"GERAN Physical Sub-channels", ETSI SMG2 Working Session on EDGE, Seattle, Washington USA, May 8-12, 2000.

* cited by examiner

*Primary Examiner*—William D. Cumming
(74) *Attorney, Agent, or Firm*—Staas & Halsey LLP

(57) ABSTRACT

Subscriber terminals of different service feature classes are accessed on access channels of a communication system with different service feature classes. At least two access channels (RACH1, RACH2) of a different service feature class are provided in the communication system.

21 Claims, 2 Drawing Sheets use a first access channel to request a communications connection associated with a first service class, which has bi-directional transmission channels use a second access channel, different from the first access channel, to request a communications connection associated with a second service class, which has unidirectional transmission channels

ACCESS METHOD IN COMMUNICATIONS SYSTEMS WITH DIFFERENT SERVICE FEATURE CLASSES, AND A CORRESPONDING COMMUNICATIONS SYSTEM

CROSS REFERENCE TO RELATED APPLICATIONS

This application is based on and hereby claims priority to PCT Application No. PCT/DE01/02927 filed on 1 Aug. 2001 and German Application No. 100 38 256.8 filed on 4 Aug. 2000, the contents of which are hereby incorporated by reference.

BACKGROUND OF THE INVENTION

The present invention relates to a method for access from subscriber terminals in different service classes to access channels in a communications system having different service classes, and to a correspondingly designed communications system.

Currently existing communications systems are being continually improved and new, upgraded or optimized services are continuously being provided in these communications systems, and are expressed in different service classes in the corresponding communications systems. Services such as these may represent specific services which a subscriber to the communications system can use directly, such as speech, data or multimedia communication, or accompanying services such as a call answering function or the like. However, it is also possible to provide services which relate to the internal procedures in the communications system, such as the nature, number and capacity of communications channels, the way in which data is passed on or processed, or the like.

WO 98/24250 A2 describes a communications system in which a mobile station, which is referred to as VIP MS, has its own access channel, by which it receives exclusive access to special packet data channels, as required.

One example of this is mobile radio systems, in which second-generation mobile radio systems are currently operated, in particular such as GSM or GPRS, and third-generation mobile radio systems are specified, in particular such as UMTS or UTRAN. In this case, networks are also envisaged which form an interface function between second- and third-generation mobile radio systems, in particular such as GERAN networks, and which thus have facilities which allow services for the second generation and third generation of mobile radio systems in parallel. In this case, the radio transmission part (radio interface) of the GERAN network is designed on the basis of the second generation of mobile radio systems, while the landline network part of the GERAN network is designed on the basis of the third generation of mobile radio systems. A GERAN system thus supports not only the A interface for line-switched connections and the Gb interface for packet-switched connections for the second generation, but also the Iups interface for package-switched connections and the Iucs interface for line-switched connections for the third generation.

By way of example, the provision of bidirectional communications channels is intended as a service in one of the first service classes—corresponding to the second generation of mobile radio systems—for GERAN networks of this type, that is to say channels in the downlink direction from the communications system to a subscriber terminal and in the uplink direction from the subscriber terminal to the communications system, which channels are coupled to one another and have a defined frequency separation (45 MHz) and a defined separation in the time slot structure (3 time slots) for the TDMA radio interface for the GERAN network. On the other hand, the service may also include as a further service class unidirectional communications channels in the uplink direction or downlink direction, which are not coupled to any corresponding second channel and thus allow greater flexibility for assignment of transmission capacities to communications connections. This makes it possible to make better use of the total available transmission capacities, allowing more communications connections to be supplied with the necessary transmission capacity than in the case of systems with bidirectional channels. These measures are described, by way of example, in Tdoc 2e00–126 "GERAN Physical Sub-Channels", ETSI SMG2 Working Session on EDGE, Seattle, Wash. USA, May 8–12, 2000.

Specifically, subscriber terminals can access communications systems via specific access channels. For example, a specific, common signaling channel (common control channel CCCH) is provided in mobile radio systems for this purpose, and is in the form of an access channel (random access channel RACH). However, previous access methods have not allowed a subscriber terminal to be assigned to the services in good time in that service class which is necessary or optimum for the service class of that terminal overall or the service currently being requested by the subscriber terminal. In fact, such optimized assignment is carried out only in a second step after a previously complete access by the subscriber terminal to the communications system, and this increases the signaling complexity or may even make it necessary for the terminal to access the communications system once again, on this occasion specifically directed at the appropriate services in the appropriate service class (directed retry).

SUMMARY OF THE INVENTION

One possible object of the present invention is therefore to provide optimized access from subscriber terminals to a communications system, making it possible to take into account the specific service classes of the subscriber terminals, with as little complexity as possible.

The method according to one aspect of the invention is used for access by subscriber terminals in different service classes to access channels in a communications system with different service classes. Provision is now made for at least two access channels with different service classes to be provided in the communications system. This means that any subscriber terminal can make contact, depending on its service class or the service class of the currently requested service, with those devices in the communications system which have the appropriate service class, by accessing the appropriate access channel even during the first access to the communications system. This was impossible in previous access methods, since only one access channel was provided in the previously known systems, and this did not make it possible to distinguish between the service class of the subscriber terminals or between the services requested by them. The solution now makes the appropriate association with the appropriate service classes possible at the earliest possible time.

In principle, the solution can be used in any type of communications system which provides access from subscriber terminals via access channels and which provides different service classes.

Depending on the nature and number of service classes in the communications system, it is now possible for one access channel to be provided for each service class in the communications system. However, certain service classes may also be combined to form a higher-level service class, for example individual services for a mobile radio system may be combined to form a service class which corresponds to the generation for these services or to the development stage (release) within one generation. This makes it possible to define in particular higher and lower service classes, depending on the nature and the quality of the services contained in them.

Subscriber terminals in a higher service class, which cover both the services in this higher service class and the services in a lower service class, can either access the communications system basically via the appropriate access channel of the higher service class, or else they can make this access dependent on the currently requested service. If this service can be handled alternatively or even better via the services in the lower service class, then the subscriber terminal in a situation such as this can access the access channel of the appropriate lower service class, in order to keep the services in the higher service class free for those subscriber terminals whose services can be handled only in this way. It is sensible to allow only access to one access channel in the lower service class for subscriber terminals in the lower service class.

As already described, in a situation such as this, specific services in a second-generation mobile radio system may be provided as the first service class, while specific services in a third-generation mobile radio system can be provided as the second service class. Alternatively, however, the service classes may also represent services at different development levels (release) of mobile radio systems within one generation of mobile radio networks.

In the case of a GERAN network as described above, by way of example, bidirectional transmission channels may thus be provided as a first service class, with unidirectional transmission channels being provided as the second service class, and with a first access channel being provided in a bidirectional transmission channel, and a second access channel being provided in a unidirectional transmission channel. Depending on the capability to process bidirectional or unidirectional transmission channels, the subscriber terminal can then access the appropriate access channel for it, and can thus initiate access to the communications system. The further connection to the communications system can then be made automatically in the appropriate service class, which is intrinsically defined by the nature of the access.

The two access channels may be inserted in various suitable manners into the structure of the transmission channels or of the physical carries of the communications system. The transmission channel for the second access channel may thus be provided on the same physical carrier as the transmission channel for the first access channel, or the transmission channel for the second access channel may be provided on a different physical carrier than the transmission channel for the first access channel.

The inventors also propose a communications system which has devices for different service classes for setting up communications connections to subscriber terminals in different service classes. Devices are now provided for assignment of at least two access channels for the subscriber terminals. As already described above, the subscriber terminals can be allocated in an objective manner to the service classes in the communications system in a simple manner and at a very early time via these separate access channels.

Specifically, the communications system may be in the form of a mobile radio system and may have first devices for the second generation of mobile radio systems as well as second devices for the third generation of mobile radio systems. One such mobile radio system would be a GERAN network, as has already been described above.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
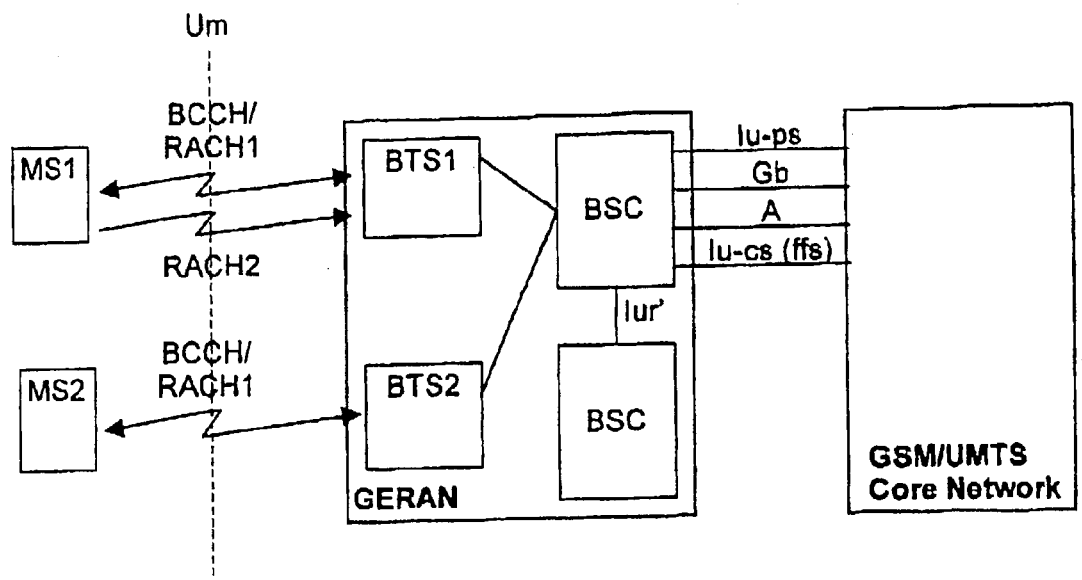
FIG. 1 shows a schematic illustration of the access to a GERAN network.

Reference will now be made in detail to the preferred embodiments of the present invention, examples of which are illustrated in the accompanying drawings, wherein like reference numerals refer to like elements throughout.

FIG. 1 shows a schematic illustration of a mobile radio system which is intended to be used as a specific example of a communications system which operates according to the described method. The mobile radio system illustrated here essentially comprises a GERAN network which is used as an interface to a central network (core network) which on the one hand may be designed on the basis of one of the second-generation mobile radio system standards (GSM), and on the other hand may also be designed on the basis of one of the third-generation mobile radio system standards (UMTS). The aim here is to consider the situation in which the core network provides not only services for the second-generation mobile radio system but also for the third-generation mobile radio system, so that the GERAN network is configured appropriately to provide these services as well. The GERAN network is thus designed firstly to provide services for a service class of the second generation of mobile radio systems, and secondly to provide services for a service class for the third generation of mobile radio systems.

For this purpose, the GERAN network is connected to the core network firstly via interfaces for the second generation (A interface for line-switched connections and Gb interface for packet-switched connections) and secondly via interfaces for the third generation (Iucs interface for line-switched connections and Iups interface for packet-switched connections). No final decision has yet been made on whether the Iucs interface will actually be used in GERAN networks. This interface is therefore annotated by the note ffs (for further study) in FIG. 1. The GERAN network contains base station controllers BSC, which are connected to one another via an Iur' interface and are connected to base stations (base transceiver stations) BTS1, BTS2 which, as the actual transmitting and receiving devices, produce the connection to subscriber terminals MS1, MS2.

At the subscriber terminal end, in this case in the form of mobile subscriber terminals MS1, MS2, the GERAN network has a radio interface Um which is designed essentially on the TDMA principle for the second generation of mobile radio systems but which, in addition to the services for the second generation, can likewise offer services for the third generation in order to create an effective connection between the subscriber terminals MS1, MS2 and the appropriate interfaces to the core network. The subscriber terminals MS1, MS2 may likewise have different service classes, which correspond to services for the second or third generation of mobile radio systems. In particular, it is assumed here that the subscriber terminal MS1 is designed such that it can process not only bidirectional communications connections such as those in previous mobile radio systems for the second generation, but also unidirectional communications connections such as those proposed for third-generation mobile radio systems. In contrast, the subscriber terminal MS2 is assumed to be designed such that it can process only bidirectional communications connections.

Figure 4:
FIG. 4 is a block diagram showing a method according to one embodiment of the invention.

At the radio interface Um end of the GERAN network, two access channels RACH1, RACH2 are now provided for the subscriber terminals MS1, MS2 with the different service classes, rather than only one access channel RACH as in the past. In this case, the first access channel RACH1 is provided for a service in a lower service class, namely for a bidirectional communications connection. In contrast, the second access channel RACH2 is provided for a service in a higher service class, namely for a unidirectional communications connection. (See FIG. 4.) The second-generation subscriber terminals MS1, which can likewise be associated with this lower service class, can thus access only the first access channel RACH1 while, in contrast, the third-generation subscriber terminals MS2 can access either the first access channel RACH1 or else the second access channel RACH2. In this case, it has not yet been defined when and under what conditions the third-generation subscriber terminals MS2 will access which of the access channels RACH1, RACH2. This may be defined in any suitable manner. The definition can advantageously be made controlled by signaling in a common signaling channel in the downlink direction (downlink DL), the broadcast control channel BCCH. This means that the BCCH will contain the instruction for the subscriber terminals MS2 as to whether, for example, they should generally have access to the communications system on a specific access channel RACH1, RACH2 of the two access channels RACH1, RACH2, or whether they should have access to a specific access channel RACH1, RACH2, for example the unidirectional channel RACH2, in order to provide specific services, and should otherwise always access the other access channel RACH1, which in this case represents the standard access channel. The other subscriber terminals MS1 in the lower service class would receive (via the signaling channel BCCH) only the signaling to always access the access channel RACH1.

Figure 2:
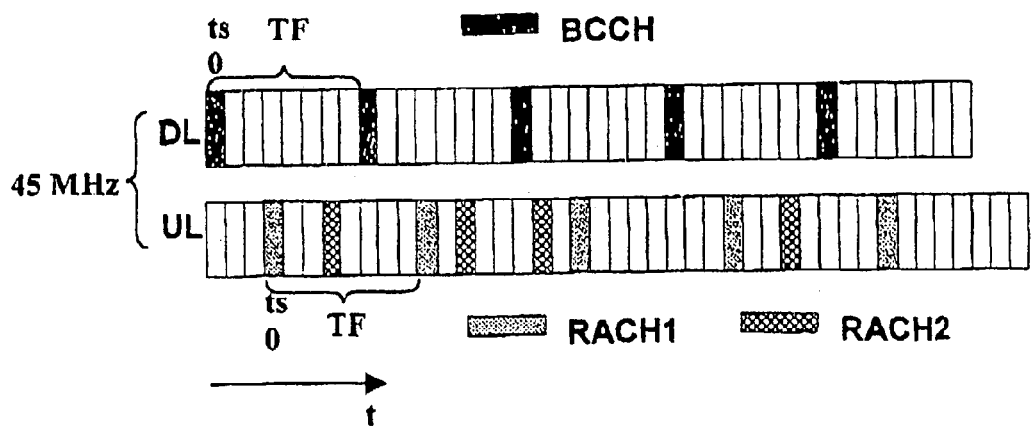
FIG. 2 shows a schematic illustration of the channel structure of two access channels within a bidirectional communications channel.

As illustrated in FIG. 2, the first access channel RACH1 is located in the first time slot tsO in a time slot frame TF on that carrier in the uplink direction UL which forms a pair with the BCCH carrier in the downlink direction DL. There, the BCCH is likewise located in the first time slot ts0 of a time slot frame TF. The frequencies of the two carriers are separated from one another by a certain frequency separation, which differs depending on the nature of the mobile radio system and on the frequency bands used there. In mobile radio systems which operate in accordance with a GSM 900 standard, that is to say for transmissions in the 900 MHz band, the frequency separation is 45 MHz, as illustrated in FIG. 2. The time slot schemes are offset by three time slots ts with respect to one another in time, so that the first time slot ts0 in a time slot frame TF in the downlink direction DL of the BCCH carrier is offset by three time slots with respect to the first time slot ts0 of the RACH carrier in the uplink direction UL.

As shown in FIG. 2, the second access channel RACH2 may now be provided on the same carrier in the uplink direction UL as the first access channel RACH1, but in different time slots.

Figure 3:
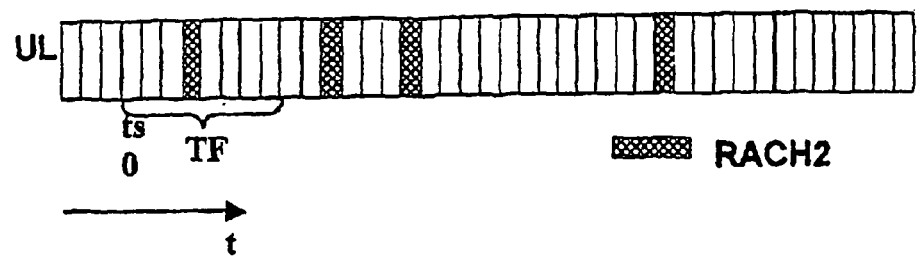
FIG. 3 shows a schematic illustration of the channel structure of the unidirectional access channel within a unidirectional communications channel.

FIG. 3 shows an alternative way to insert the second access channel RACH2 into the structure of the transmission channels. Here, the second access channel RACH2 is provided on a separate, purely unidirectional carrier in the uplink direction UL.

The method and apparatus thus make it possible in a simple manner to distinguish between subscriber terminals in different service classes by accessing access channels for different service classes, in the present specific example in particular by using the different capability of subscriber terminals MS1, MS2 to process bidirectional or unidirectional communications connections.

The invention has been described in detail with particular reference to preferred embodiments thereof and examples, but it will be understood that variations and modifications can be effected within the spirit and scope of the invention.

The invention claimed is:

1. A method for communications connections in a communications system, comprising:
    using a first access channel to request a communications connection associated with a first service class, which has bi-directional transmission channels;
    using a second access channel, different from the first access channel, to request a communications connection associated with a second service class, which has unidirectional transmission channels; and
    performing the communications of the first and second classes using at least one third channel different from the first and second access; and
    performing the communications of the first and second classes using at least one third channel different from the first and second access channels.

2. The method as claimed in claim 1, wherein a subscriber terminal optionally uses one of the first and second access channels.

3. The method as claimed in claim 1, wherein a subscriber terminal exclusively uses one of the first and second access channels.

4. The method as claimed in claim 1, wherein one access channel is provided for each service class.

5. The method as claimed in claim 1, wherein
    access to the first access channel is provided for first subscriber terminals, and access to the first access channel or the second access channel is provided for second subscriber terminals, depending on service requirements for the second subscriber terminals.

6. The method as claimed in claim 5, wherein
    subscriber terminals with capability for only one service class have access to only one access channel, and
    subscriber terminals with capability for both service classes have access to both access channels.

7. The method as claimed in claim 5, wherein
    the first service class provides services for a second-generation mobile radio system, and the second service class provides services for a third-generation mobile radio system.

8. The method as claimed in claim 5, wherein the first and second service classes relate respectively to older and newer protocols within a single generation of mobile radio systems.

9. The method as claimed in claim 1, wherein
the first access channel is used to access a first transmission channel,
the second access channel is used to access a second transmission channel, and
the first and second transmission channels are provided on a single physical carrier.

10. The method as claimed in claim 1, wherein
the first access channel is used to access a first transmission channel,
the second access channel is used to access a second transmission channel, and
the first and second transmission channels are provided on different physical carriers.

11. The method as claimed in claim 4, wherein
access to the first access channel is provided for first subscriber terminals, and access to the first access channel or the second access channel is provided for second subscriber terminals, depending on service requirements for the second subscriber terminals.

12. The method as claimed in claim 11, wherein the first service class provides services for a second-generation mobile radio system, and
the second service class provides services for a third-generation mobile radio system.

13. The method as claimed in claim 11, wherein the first and second service classes relate respectively to different development levels within a single generation of mobile radio systems.

14. The method as claimed in claim 12, wherein
the first access channel is used to access a first transmission channel,
the second access channel is used to access a second transmission channel, and
the first and second transmission channels are provided on a single physical carrier.

15. The method as claimed in claim 13, wherein
the first access channel is used to access a first transmission channel,
the second access channel is used to access a second transmission channel, and
the first and second transmission channels are provided on a single physical carrier.

16. The method as claimed in claim 12, wherein
the first access channel is used to access a first transmission channel,
the second access channel is used to access a second transmission channel, and
the first and second transmission channels are provided on different physical carriers.

17. The method as claimed in claim 13, wherein
the first access channel is used to access a first transmission channel,
the second access channel is used to access a second transmission channel, and
the first and second transmission channels are provided on different physical carriers.

18. A communications system, comprising:
a first device to provide a first access channel for receiving requests for communications connections associated with a first service class, which has bi-directional transmission channels; and
a second device to provide a second access channel for receiving requests for communications connections associated with a second service class, which has unidirectional transmission channels wherein
the communication of the first service class is performed using at least one first transmission channel,
the communication of the second service class is performed using at least one second transmission channel, and
the transmission channels are different from the first and second access channels.

19. The communications system as claimed in claim 18, wherein
the communications system is a mobile radio system,
the first device processes access requests associated with a second generation of mobile radio systems, and
the second device processes access requests associated with a third generation of mobile radio systems.

20. A method for communications connections in a communications system, comprising:
using a first access channel to request a mobile communications connection associated with a lower service class, which has bi-directional transmission channels; and
using a second access channel, different from the first access channel, to request a mobile communications connection associated with a higher service class, which has unidirectional transmission; and
performing the communications of the first and second classes using at least one third channel different from the first and second access channels.

21. The method as claimed in claim 20, wherein the first and second access channels are wireless access channels.

* * * * *